W. L. GILBERT.

SHUTTLES FOR WEAVING-DUCK, &c.

No. 7,776. Reissued July 3, 1877.

Witnesses.

L. McGuiled

John Ribner

Walter L. Gilbert by his attorney.

R. H. Eddy

UNITED STATES PATENT OFFICE.

WALTER L. GILBERT, OF PLYMOUTH, MASSACHUSETTS.

IMPROVEMENT IN SHUTTLES FOR WEAVING DUCK, &c.

Specification forming part of Letters Patent No. 191,526, dated June 5, 1877; Reissue No. 7,776, dated July 3, 1877; application filed June 11, 1877.

*To all whom it may concern:*

Be it known that I, WALTER L. GILBERT, of the town and county of Plymouth, of the State of Massachusetts, have invented a new and useful Improvement in Shuttles for Weaving Duck or Various other Heavy Cloths; and do hereby declare the same to be described in the following specification and represented in the accompanying drawings, of which—

Figure 1:
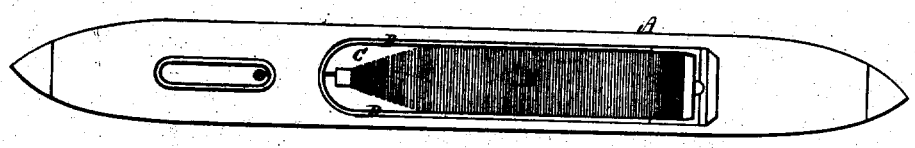
Figure 2:
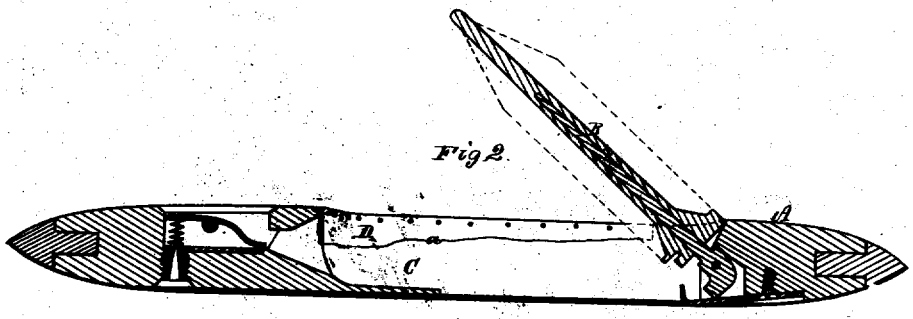
Figure 3:
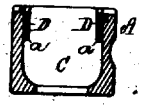

Figure 1 is a top view, Fig. 2 a longitudinal section, and Fig. 3 a transverse section, of a shuttle provided with my invention.

Heretofore, as shuttles for weaving duck generally have been constructed, the sides of their bobbin-chambers have been so smooth that the heavy weft, while being rapidly drawn off the bobbin in the process of weaving, became liable, by the centrifugal force generated in it, to run off too freely, and became snarled, knotted, or kinked, particularly at the times when the shuttle was arrested in its flight. In consequence of this it occasionally or frequently happens that a considerable waste or loss of weft and stoppage of the loom result, all of which it is the object of my invention to prevent.

I accomplish this by providing the bobbin-chamber of the shuttle with a shoulder or abutment projecting from its side or sides, or from such and its front end. This shoulder or abutment may be formed by a piece or strip of cloth, or other suitable material, applied or fixed to the inner surface of the chamber, and extending down from its top, in manner as represented.

In the drawings, A denotes the shuttle; B, the bobbin; C, the bobbin-chamber, and D the strip of cloth or other material, whose lower edge, arranged as shown, constitutes a shoulder or abutment, *a*, against which the weft, while being rapidly unwound and deflected laterally, is thrown, and thereby is substantially prevented from being driven upward out of the shuttle-chamber, so as to become kinked, knotted, or snarled. The surface of the cloth or lining above the aforesaid shoulder, being exposed to the weft, will, by its friction on it, aid in preventing it from being thrown up out of the bobbin-chamber; but it is the shoulder or abutment or lower edge of the cloth by which the weft is mostly if not entirely arrested.

The cloth lining I usually arrange on opposite sides and at the front end of the bobbin-chamber; or, in fact, wherever therein such may be advantageously employed for the purpose as mentioned, the lining being secured in place by cement or tacks.

Practice has demonstrated the great utility and advantage of the shoulder or abutment *a*, or the friction-lining by which such is produced.

What I claim as my invention is as follows:

1. A loom-shuttle provided with a shoulder or abutment, *a*, arranged in a bobbin-chamber of such shuttle, substantially in manner and for the purpose as set forth.

2. A loom-shuttle provided with a cloth or friction lining, D, arranged in the bobbin-chamber of such shuttle, substantially as and for the purpose specified.

WALTER L. GILBERT.

Witnesses:

WM. S. DANFORTH,

D. H. GILBERT.